United States Patent [19]

Maryatt et al.

[11] 3,781,486

[45] Dec. 25, 1973

[54] MAGNETIC HEAD TRANSDUCER

[75] Inventors: Michael B. Maryatt, Cupertino; James M. McCoy, San Jose, both of Calif.

[73] Assignee: Avco Corporation

[22] Filed: Apr. 26, 1972

[21] Appl. No.: 247,690

[52] U.S. Cl. 179/100.2 C, 340/174.1 F, 346/74 MC

[51] Int. Cl. .......................... G11b 5/22, G11b 5/42

[58] Field of Search ................ 179/100.2 C; 29/603; 340/174.1 F; 346/74 MC; 252/62.56

[56] References Cited

UNITED STATES PATENTS

| | | | |
|---|---|---|---|
| 3,629,519 | 12/1971 | Hanak | 179/100.2 C |
| 3,656,229 | 4/1972 | Sakurai | 179/100.2 C |
| 3,562,444 | 2/1971 | Hoogendoorn et al. | 179/100.2 C |
| 3,271,718 | 9/1966 | Shaw | 29/603 |
| 3,495,325 | 2/1970 | Bos et al. | 179/100.2 C |
| 3,458,926 | 8/1969 | Maissel et al. | 179/100.2 C |
| 3,624,897 | 12/1971 | Reade et al. | 179/100.2 C |
| 3,566,045 | 2/1971 | Paine | 179/100.2 C |
| 3,557,266 | 1/1971 | Chiba et al. | 252/62.56 |

*Primary Examiner*—Vincent P. Canney
*Assistant Examiner*—Alfred H. Eddleman
*Attorney*—Charles M. Hogan et al.

[57] ABSTRACT

A thin layer of nonmagnetic material, such as silicon dioxide, is chemically vapor deposited on confronting gap faces of a pair of ferromagnetic pole pieces. The pole pieces are bonded together in abutting relationship so that the nonmagnetic material defines a transducing gap between the pole pieces. Preferably the pole pieces are formed in relatively thick blocks that are bonded together after the nonmagnetic material is deposited and then sliced to form a plurality of individual transducers.

6 Claims, 3 Drawing Figures

PATENTED DEC 25 1973 3,781,486

MAGNETIC HEAD TRANSDUCER

The present invention relates to magnetic head transducers and more particularly to apparatus and a method for forming the nonmagnetic gap between a pair of pole pieces of this type transducer.

It is a common object in the art of magnetic transducer head design to provide as small a transducing gap as possible between the pole pieces of the transducer. The reason for this is that a smaller gap will enable the reproduction of higher frequency signals from a magnetic storage medium moving past the gap at a given speed. In the past, thin gaps have been achieved by utilizing shims of aluminum, bronze, platinum or copper foil between opposed pole pieces. In addition, glass and other materials have been melted into the gap between the opposed pole pieces. These approaches have often not permitted the use of a gap that is sufficiently small to achieve the reproduction of higher frequency signals.

To overcome the deficiencies of these methods the process of vacuum depositing the nonmagnetic material on the transducer faces has been utilized. The vacuum depositing technique, while enabling an extremely small transducing gap, is expensive and requires a great deal of care. A vacuum must be maintained around the pole pieces and the pole pieces have to be scrupulously clean to enable uniform bonding of the material.

Therefore it is an object of the present invention to provide an extremely thin nonmagnetic gap for a magnetic head transducer in a simplified and economical fashion.

The above ends are achieved by chemically vapor depositing a nonmagnetic material on at least one of a pair of confronting gap faces of pole pieces comprising a magnetic transducer.

The above and other related objects and features of the present invention will be apparent from a reading of the description of the disclosure shown in the accompanying drawing and the novelty thereof pointed out in the claims.

Figure 1:
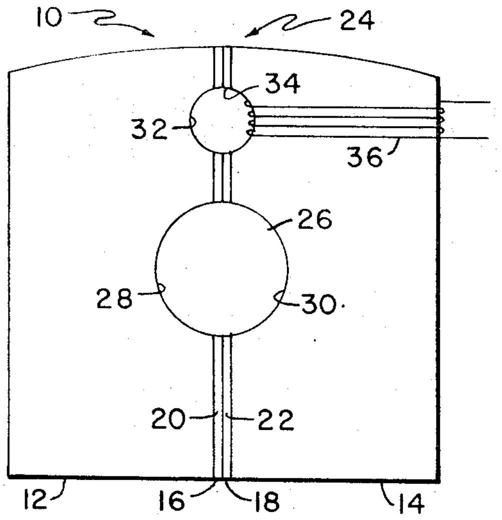
FIG. 1 is a side view of a completed magnetic transducer embodying the present invention.

Referring now to FIG. 1, there is shown a magnetic head transducer 10 embodying the present invention. The transducer end comprises first and second pole pieces 12 and 14 of suitable ferromagnetic material. Pole pieces 12 and 14 have confronting opposed coplanar gap faces 16 and 18, respectively. These gap faces are spaced by a predetermined amount by a chemically vapor-deposited nonmagnetic material on at least one of the gap faces. As herein illustrated, the nonmagnetic material comprises a layer 20 on gap face 16, a layer 22 on gap face 18 so that the thickness of the individual layer is approximately one half of the total gap to be desired between the pole pieces 12 and 14. It should be apparent, however, to those skilled in the art that the total thickness of the gap may be utilized by depositing the material on one of the coplanar end faces. The dividing of the thickness enables an improved wearability across a transducing gap 24 at one end of the pole pieces.

The details of the deposition of the nonmagnetic material will be discussed below. However, for the present it is noted that the nonmagnetic material is deposited across the entire confronting gap faces of the pole pieces 12 and 14.

Pole pieces 12 and 14 are maintained in abutting relationship along the gap faces 16 and 18 by a bond joint 26 formed in complementary recesses 28 and 30, spaced from the transducing gap 24 of pole pieces 12 and 14, respectively. Preferably, recesses 28 and 30 are not deposited with the nonmagnetic material to enable bonding without the need to remove the material. A second pair of complementary recesses 32 and 34 are provided in the pole pieces 12 and 14 adjacent the transducer face 24. These recesses cooperate to form an opening through which one or more coils 36 are wound. The coil 36 is supplied with electrical current to magnetically bias the transducer for recording or playback.

Figure 2:
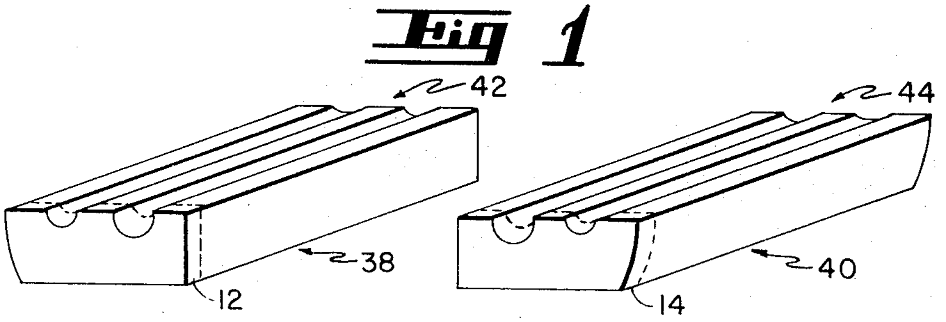
FIG. 2 is a perspective view showing an intermediate stage in the manufacture of the magnetic head transducer of FIG. 1.
Figure 3:
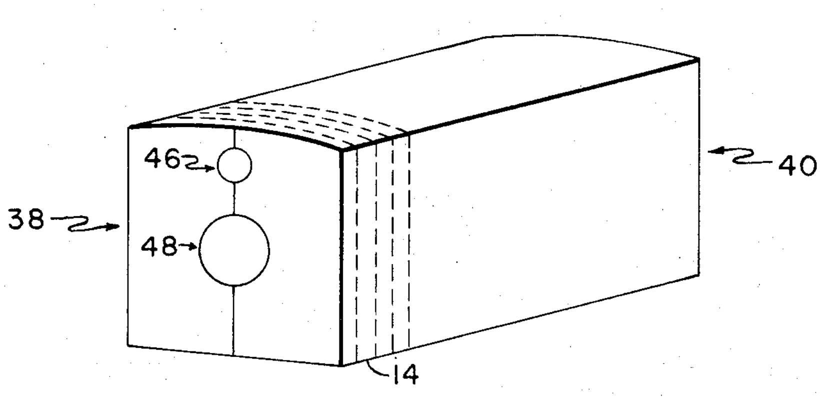
FIG. 3 is still another view illustrating a subsequent stage in the manufacture of the magnetic head transducer of FIG. 1.

The transducer is manufactured using the process described below. As shown in FIG. 2, the pole pieces 12 and 14 are formed from slices taken from blocks 38 and 40 having the same cross section as the pole pieces 12 and 14 but with a much greater thickness that is equal to the thickness of a plurality of pole pieces.

The layers of nonmagnetic material 20 and 22 are chemically vapor deposited over the entire extent of the blocks 38 and 40, except for recesses 28 and 30 which are masked by a suitable arrangement (not shown).

Deposition is accomplished by the use of a deposition reactor in which a combination of gases incorporating the nonmagnetic material is allowed to flow over the blocks 38 and 40 that have been heated to a predetermined temperature. A number of deposition reactors may be utilized for this purpose.

The deposition takes place in the following three steps in an inert atmosphere:

1. The blocks 38 and 40 are heated to a predetermined temperature by an accurately controlled heating device.
2. The heated blocks are positioned in the appropriate gases. The gases contain the chemicals for depositing the nonmagnetic material and the heated blocks 38, 40 cause the gas to react and the coating takes place on the faces 42 and 44.
3. The blocks 38 and 40 are then permitted to cool to room temperature.

The gases used for the deposition process may be as follows: A silicon-bearing gas, such as silane, and an oxygen-bearing gas, such as $O_2$, appropriately diluted in an inert gas stream, such as nitrogen. This combination results in a coating of silicon dioxide. It should be apparent to those skilled in the art that other nonmagnetic material-bearing gases may be chemically vapor deposited with similar results. Examples would be aluminum or chromium-bearing gases producing aluminum oxide and chromium oxide, respectively. Additional gases may be added to tailor the thermal coefficient of expansion of the nonmagnetic gap. Examples would be phosphorus or boron-containing gases.

The time, temperature and gas flow during the second step are continuously monitored to enable very precise control over the thickness of the nonmagnetic film. It has been found that with this process the thickness of the nonmagnetic material may be above zero and up to five microns in thickness.

Once the required thickness of nonmagnetic material has been deposited, the blocks 38 and 40 are joined so that the confronting faces 42 and 44 abut and that the complementary recesses in the blocks form through passages 46 and 48. With the blocks 38 and 40 in abutting relationship they are bonded together through passage 48.

Once this has been completed a plurality of transducers 10 are formed by slicing the blocks 38 and 40 in the same fashion that one would slice a loaf of bread to form individual transducers. The coil 36 is then wound through complementary recesses 32, 34 and the transducer is ready to be installed on a magnetic signal-reproducing device.

The chemical vapor-depositing process referred to above enables a substantial decrease in the cost of manufacture of the transducers. There are several reasons for this, the first of which is that the parts need not be minutely cleaned, as is necessary with the prior art vacuum-deposition techniques. It is only necessary to perform a routine cleaning of the surfaces. A second reason is that the deposition takes place at atmospheric pressures which eliminates totally the need for the very expensive vacuum chambers necessary for the vacuum-deposition technique. A third reason is that the process may be performed using simple devices rather than requiring an intricate special device incorporating a depositing mechanism within a vacuum chamber as with the vacuum-depositing device.

The process enables a high degree of flexibility in the manufacture of the transducer. For example, the coating may be placed on one of the pole pieces or on both. Additionally, the successive thicknesses may be built up without destroying the adhesion of the previous layer.

While the preferred embodiment of the present invention has been described, it should be apparent to those skilled in the art that it may be practiced in other fashions without departing from the spirit and scope of the present invention.

Having thus described the invention, what is claimed as novel and desired to be secured by Letters Patent of the United States is:

1. A magnetic head transducer comprising:
- a pair of ferromagnetic pole pieces having confronting gap faces;
- a layer of silicon dioxide material of a predetermined thickness chemically vapor-deposited from silane gas under atmospheric pressure conditions on at least one of the gap faces of said pole pieces;
- means for securing the gap faces of said pole pieces to one another in abutting relationship to establish a magnetic circuit between said pole pieces, said magnetic circuit having a transducing gap defined by the nonmagnetic material.

2. A magnetic head transducer as in claim 1 wherein the thickness of said nonmagnetic material is above 0 and up to 5 microns in thickness.

3. A magnetic head transducer as in claim 1 wherein said nonmagnetic material is deposited on both of the gap faces of said pole pieces.

4. A magnetic head transducer as in claim 1 wherein:
- said transducing gap is defined at one end of the gap faces of said pole pieces;
- said nonmagnetic material is secured over substantially all of the gap faces of said pole pieces; and
- said securing means comprises a bonded joint securing said pole pieces at a position spaced from the transducing gap.

5. A magnetic head transducer as in claim 4 wherein:
- said gap faces each have recesses adjacent said transducing gap thereby forming an opening;
- said transducer further cmprises at least one coil of wire wrapped around said pole pieces and through said opening.

6. A magnetic head transducer as in claim 5 wherein said pole pieces have an additional pair of cooperating recesses, thereby forming a second opening through which said bonded joint extends.

* * * * *